United States Patent
Moore

[15] 3,671,598
[45] June 20, 1972

[54] ISOMERIZATION OF CYCLIC HYDROCARBONS

[72] Inventor: Robert E. Moore, Wilmington, Del.
[73] Assignee: Sun Oil Company, Philadelphia, Pa.
[22] Filed: March 24, 1971
[21] Appl. No.: 127,772

[52] U.S. Cl. .................260/666 M, 260/666 P, 260/666 R
[51] Int. Cl. .........................................C07c 3/54, C07c 13/78
[58] Field of Search....................260/666 M, 666 P, 666 R

[56] References Cited

UNITED STATES PATENTS 3,382,288  5/1968  Schneider..........................260/666 M
3,546,308  12/1970  Moore..............................260/666 M Primary Examiner—Delbert E. Gantz
Assistant Examiner—Veronica O'Keefe
Attorney—Donald R. Johnson, Wilmer E. McCorquodale, George L. Church, Donald R. Johnson and John F. McNally

[57] ABSTRACT

Saturated cyclic hydrocarbons having a carbon range of from seven to 50 carbon atoms are isomerized by contacting with sulfuric acid having an $H_2SO_4$ equivalent in the range of 85 to 102 percent by weight or fluorosulfonic acid and an adamantane hydrocarbon containing zero to four alkyl groups and at least one unsubstituted bridgehead position.

10 Claims, No Drawings

ISOMERIZATION OF CYCLIC HYDROCARBONS

CROSS-REFERENCE TO RELATED APPLICATIONS

My copending application Ser. No. 127,784, filed Mar. 24, 1971 of even date herewith discloses and claims the preparation of conjugated dienes of polycyclic naphthenes containing three or more fused rings by contacting the polycyclic naphthenes with a strong acid and an adamantanol compound having at least one unsubstituted bridgehead position. This reaction may be conducted at a temperature between the freezing point of the acid and 50° C.

BACKGROUND OF THE INVENTION

1. Field of the Invention

This invention relates to a novel catalytic process for the isomerization of saturated cyclic hydrocarbons containing from seven to 50 carbon atoms having one or more saturated rings and containing at least five carbon atoms in each ring.

2. Description of the Prior Art

Various catalytic methods have been used from time to time for the isomerization of hydrocarbons. Many have required high temperature operation, expensive or hard to handle catalysts, expensive corrosion-resistant equipment and/or complex recovery procedures in order to carry these isomerization reactions. To be more specific, the standard catalytic methods for the isomerization of hydrocarbons use aluminum halides, hydrogen fluoride and the like.

It would be desirable if methods were available which employed relatively cheap catalyst materials. But even more importantly economically convenient procedures involving simple catalyst systems which are easy to handle, enable the isomerization reaction to take place at mild conditions and do not involve a complex or difficult separation and recovery procedure would be highly advantageous. In addition it would be desirable if the isomerization procedure would not require any regeneration or conversion of catalysts or a complex separation and recovery procedure of the products. Likewise, it would also be desirable if the above could be achieved in relatively simple and inexpensive equipment.

SUMMARY OF THE INVENTION

It has now been found, in accordance with the present invention, that the isomerization of saturated cyclic hydrocarbons containing form seven to 50 carbon atoms having one or more saturated rings and containing at least five carbon atoms in each ring is catalyzed by either sulfuric acid having an acid strength of 85 to 102% $H_2SO_4$ equivalent by weight or fluorosulfonic acid and an adamantane hydrocarbon having zero to four alkyl groups and at least one unsubstituted bridgehead position.

The present process thus provides a means of preparing a wide variety of isomerized hydrocarbons having numerous uses, particularly as traction fluid compositions.

DESCRIPTION OF THE PREFERRED EMBODIMENTS

The isomerization of the saturated cyclic hydrocarbon is effected by contacting a mixture of the saturated cyclic hydrocarbon and the adamantane compound with either fluorosulfonic acid or sulfuric acid having an acid strength in the range of 85-102% $H_2SO_4$ equivalent by weight. The isomerization may be skeletal (position) or cis-trans.

The alicyclic hydrocarbon of the $C_7$ to $C_{50}$ range having at least one five membered ring and having zero to six alkyl substituents containing one to six carbon atoms each can be isomerized according to this invention. The hydrocarbon feed can also be one or more polycyclic perhydroaromatics with two or more fused rings and three to twelve total rings inclusive. The alicyclic hydrocarbon can contain no alkyl substituents or can have one to six alkyl groups inclusive. For example, these substituents can be methyl, ethyl, n-propyl etc., or any combination of these alkyl groups. However, the alkyl substituents should be located at positions other than ring junctions. Gem substitution of the alkyl groups on rings is permissible.

Any aromatic hydrocarbon that can be hydrogenated to produce perhydroaromatics as defined herein above can be used in the present process. For example the corresponding aromatic hydrocarbon can be derived from sources such as straight run or cracked petroleum fractions and coal tar. Such aromatic hydrocarbons can serve as suitable starting material and can be readily converted into perhydroaromatics for use in the present process by complete hydrogenation utilizing a suitable catalyst. One suitable catalyst for this purpose is Raney nickel. Appropriate hydrogenation conditions when using this catalyst include a temperature of 200°–275° C., a hydrogen pressure of 2,000–4,000 p.s.i.g., a catalyst to hydrocarbon weight ratio of 1:4 to 1:20 and a reaction time of 2–12 hours. Other suitable catalysts that can be used include platinum, cobalt molybdate, nickel tungstate or nickel sulfide-tungsten sulfide, with these hydrogenating components being deposited on alumina. Platinum reforming catalysts available commercially can be used for this purpose also 5 percent rhodium on carbon. These and other catalysts generally are used at the same pressure but at higher temperatures than Raney nickel such as 300°–400° C., in order to effect complete hydrogenation of the aromatic hydrocarbon.

Table I gives examples of aromatic hydrocarbons that can be hydrogenated to produce perhydroaromatics for use in the present process.

TABLE I

| Aromatic | Number of Carbon Atoms | Structural formula |
| --- | --- | --- |
| Acenaphthene | 12 | |
| 2,3-cyclopentanoindane | 12 | |
| Hydrindacene | 12 | |
| 6,7-cyclopentanoindane | 12 | |
| Fluorene | 13 | |
| 1,2-cyclopentanonaphthalene | 13 | |
| 2,3-cyclopentanonaphthalene | 13 | |

Table 1—Continued

| Aromatic | Number of Carbon Atoms | Structural formula |
|---|---|---|
| Phenalene (perinaphthane) | 13 | |
| Homotetraphthene | 13 | |
| Anthracene | 14 | |
| Phenanthrene | 14 | |
| Indane-1-spiro cyclohexane | 14 | |
| Tetralin-2-spiro cyclopentane | $C_{14}$ | |
| 1,2-; 3,4-dibenzocycloheptatriene | $C_{15}$ | |
| 2-methylanthracene | $C_{15}$ | |

Preferred cyclic hydrocarbons which isomerize according to this process comprise the cyclic hydrocarbons of the $C_7$–$C_{19}$ range and particularly the following: 1,2-dimethylcyclopentane, 1,2-dimethylcyclohexane, cis decalin, perhydrophenanthrene, dicyclohexyl and tetrahydromethyldicyclopentadiene.

The adamantane compound used for the present process can be any saturated adamantane hydrocarbon of the $C_{10}$–$C_{50}$ range having zero to two alkyl and/or cycloalkyl substituents. The alkyl or cycloalkyl groups in the alkyladamantane can be located at bridgehead or nonbridgehead positions provided that at least one bridgehead position remains unsubstituted to allow a site for the formation of the carbonium ion. These alkyl substituents can range from methyl to nonyl. The adamantane nucleus has 10 atoms, four of which are bridgehead carbons that are equivalent to each other as can be seen from the following structure:

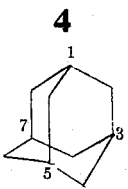

As shown, the bridgehead carbon atoms customarily are designated by the numerals 1, 3, 5 and 7 respectively and these bridgehead positions are all equivalent to each in the nuclear structure.

The preparation of adamantane compounds which are useful as catalytic components according to the present invention can be effected by known procedures such as those described for example in the following: U.S. Pats. Nos. 3,128,316; 3,275,600; 3,336,405; 3,382,288; 3,383,424; 3,437,701; Spengler et al., Erdoel and KohleErdgas-Petrochemie, 15, 702–707 (1962) and Hock et al. Recueil 85, 1,045–1053 (1966).

The most preferred adamantane hydrocarbons useful for this process are hydrocarbons of the $C_{10}$–$C_{19}$ range and particularly the following: dimethyladamantanes, trimethyladamantanes, ethyladamantanes, methylethyladamantanes and dimethyladamantanes. Some other specific examples include: adamantane; 1-methyladamantane; 2-methyladamantane; 1,2-, 1,3- and 1,4-dimethyl-adamantane; 1- and 2-ethyladamantanes; 1-ethyl-3-methyladamantane; 1-ethyl-4-methyladamantane; 1,2,4- 1,2,5-, 1,3,4-, 1,3,5- and 1,3,6-trimethyladamantanes; 1-ethyl-2,4-dimethyladamantane; 1-ethyl-3,5-dimethyladamantane; 1-ethyl- 3,6-dimethyladamantane; and 1-n propyl -3,5-dimethyladamantane. Also members containing higher alkyl groups are: 1-and 2-butyladamantanes; 1-methyl-3-propyladamantane; 1,3-dimethyl-5-butyl adamantane; 1-ethyl-2-methyl-5-hexyladamantane; 1-pentyl-4-methyladamantane; 1,3-diisobutyladamantane; n-hexyladamantanes; n-nonyladamantanes; and the like. The molar ratio of the adamantane compound to the cyclic hydrocarbon can vary widely in the reaction mixture, for example, from 0.1:1 to 5:1 but preferably 0.5:1 to 1:1.

In effecting the isomerization of the cyclic hydrocarbon with sulfuric acid it is highly important that acid strength should be in the range of 85–102% $H_2SO_4$ equivalent and more preferably 96–100% $H_2SO_4$ equivalent by weight. As the sulfuric acid strength approaches the upper limit 102% $H_2SO_4$ equivalent by weight competing reactions of isomerization and dehydrogenation may occur in some instances. With higher strengths of sulfuric acid above 102% $H_2SO_4$ equivalent by weight, the reaction is almost exclusively a dehydrogenation reaction followed by polymerization of the dehydrogenated product under these strong conditions. In this case the dehydrogenation is an unwanted side reaction. The ratio of acid to the saturated cyclic hydrocarbon compound mixture can also vary widely. Generally, a volume excess of the acid relative to the alkylated adamantane should be used and a volume ratio thereof in the range of 1:1 to 20:1 is typically employed.

Another acid found to be quite useful in the present invention is fluorosulfonic acid ($FSO_3H$). However, since the fluorosulfonic acid does not have oxidizing potentials as great as sulfuric acid concentrations of fluorosulfonic acid are not critical. It is generally employed at full strength.

This reaction can be carried out at any temperature between the freezing point of the reaction mixture and 100° C. When concentrations of acid in the lower part of the concentration range are employed, temperatures of 65°–100° C are required to obtain isomerization. Where the strength of the acid is in the higher portion of the range lower temperatures in the range of 0°–15° C. may be employed. The typical range employed is from 10°–40° C. The rate of reaction will depend upon the reaction temperature selected.

When the saturated cyclic hydrocarbon and adamantane hydrocarbon are mixed with the acid, a two phase system is formed since both hydrocarbons have a relatively low solubility in the acid. The adamantane hydrocarbon material is preferentially attacked and appears to convert to the carbonium ion form. When the adamantane hydrocarbon used is a solid at the reaction temperature employed, e.g., adamantane or 1-methyladamantane or tetramethyl adamantane it is attacked more slowly than the liquid alkyladamantanes, such as 2-methyladamantane, 1- or 2-methyladamantane, any of the dimethyladamantanes, ethylmethyladamantanes, trimethyladamantanes, or tetramethyladamantane having one or more nonbridgehead methyl groups. Also as the molecular weight of the saturated cyclic hydrocarbon is increased, the rate of reaction tends to decrease and longer mixing times are required to effect isomerization. In cases when a normally solid adamantane hydrocarbon is used, it is advantageous to add it to the acid in the form of finely divided powder to facilitate solubilization.

The process appears to involve a carbonium ion mechanism in which the adamantanyl carbonium ion abstracts a hydride ion from the cyclic hydrocarbon. An intermediate carbonium ion of the cyclic hydrocarbon is generated which then isomerizes to its most stable form.

After the reaction has been completed, the acid phase is separated from the hydrocarbon phase and the latter is distilled to separate the desired isomerized cyclic hydrocarbon from the adamantane hydrocarbon.

The following examples illustrate the invention and are presented without any intention that the invention be limited thereto.

EXAMPLE I

Run A (The Invention)

To 150 cc sulfuric acid (100% $H_2SO_4$ equivalent by weight) was charged a mixture containing 19.2 grams perhydrophenanthrene (containing about 15–20 weight percent of the *trans*, *anti*, *trans*, isomer) and 16.4 grams of 1,3-dimethyladamantane (for convenience "DMA"). The mixture was stirred vigorously with a magnetic stirrer to emulsify the hydrocarbon phase and the acid phase. Aliquot portions of about 1 cc of the emulsion were taken periodically shaken with water and then the hydrocarbon layer was analyzed by gas chromatography to follow the isomerization reaction. After 40 minutes the hydrocarbon phase was separated, washed with water, dried and distilled to separate the isomerized product from the hydrocarbon mixture. Ninety-five percent of the DMA was recovered which indicated that the DMA serves as a catalyst in the reaction. The DMA recovered was used in other runs.

The isomerized product obtained in 80 percent yield based on charged perhydrophenanthrene was analyzed by gas-liquid chromotagraphy, nuclear magnetic resonance, mass spectroscopy, infra-red, elemental analysis and was identified as 90 percent *trans*, *anti*, *trans*-perhydrophenanthrene.

Run B (Comparative)

By way of comparison the above procedure described above was repeated but without addition of DMA. The above isomerization was not observed.

EXAMPLE II

This example shows the isomerization of cis-decalin to trans-decalin.

Run A

A procedure analogous to that of Example I was followed but a sulfuric acid strength of 96% $H_2SO_4$ equivalent by weight was employed. Specifically a mixture containing 16.4 grams of DMA and 13.6 grams cis decalin were stirred vigorously in 150 cc of sulfuric acid (96% $H_2SO_4$ equivalent by weight) at room temperature. After 3 hours the hydrocarbon phase, after washing, drying and distilling contained 5 percent cis-decalin and 95 percent trans-decalin.

Run B

Proceeding as in Run A but anhydrous $FSO_3H$ was used instead of sulfuric acid. After 3 hours the reaction product consisted of 7 percent cis-decalin and 93 percent trans-decalin.

Run C

Proceeding as in Run A but substituting 19.8 grams (0.1 mole) of 1-ethyl-3,5-dimethyladamantane for the DMA, after 3 hours at room temperature the decalin consisted of 92 percent trans-decalin and 8 percent cis-decalin.

Run D (Comparative)

A control was run in which the cis-decalin was treated as above in Run A but in the absence of DMA. After 3 hours, the decalin was composed of 95 percent cis-decalin and 4 percent trans-decalin.

Runs A, B and C are the invention.

EXAMPLE III

A mixture of 11.2 grams 1,2-dimethylcyclohexane and 16.4 grams of DMA is treated as described in the example above yielding an equilibrium mixture of 1,3-dimethylcyclohexane and 1,4-dimethylcyclohexane. A control run (DMA omitted) showed that the isomerization occured 10 times faster when DMA was present.

Isomerization products prepared by the present invention have utility as components of traction fluid compositions for use in friction or tractive drive systems. Compositions for this purpose have been described, for example in W. C. Hamman et al. U.S. Pat. No. 3,411,369, issued Nov. 19, 1968, and U.S. Pat. No. 3,440,894 issued Apr. 29, 1969. The first-mentioned patent discloses the use of saturated hydrocarbons having two to nine fused rings as components of traction fluids, while the latter patent describes for the same purpose the use of saturated cyclic hydrocarbons having one or more rings each containing six carbon atoms. Compounds prepared by means of the present invention constitute compounds of the types described in these patents as well as other saturated cyclic hydrocarbons having analogous utility in traction fluids.

What is claimed is:

1. A process for the isomerization of saturated cyclic hydrocarbons containing from between seven and 50 carbon atoms which comprises contacting said saturated cyclic hydrocarbon under isomerizing conditions in the presence of a strong acid selected from the group consisting of fluorosulfonic and sulfuric acid having a strength of 85 to 102% $H_2SO_4$ equivalent by weight and an adamantane hydrocarbon containing zero to four alkyl groups and at least one unsubstituted bridgehead position.

2. The process according to claim 1 wherein said saturated cyclic hydrocarbon contains from seven to 19 carbon atoms.

3. The process according to claim 1 wherein said adamantane compound is 1,3-dimethyladamantane.

4. The process according to claim 1 wherein said adamantane is 1-ethyl-3,5-dimethyladamantane.

5. The process according to claim 1 wherein said strong acid is fluorosulfonic acid.

6. The process according to claim 1 wherein said strong acid is sulfuric acid having a strength of 85–102% $H_2SO_4$ equivalent by weight.

7. The process according to claim 1 wherein said strong acid is sulfuric acid having a strength of 96–100% $H_2SO_4$ equivalent by weight.

8. The process according to claim 1 wherein the said saturated cyclic hydrocarbon contains eight carbon atoms and said adamantane hydrocarbon is selected from the group consisting of 1,3-dimethyladamantane and 1-ethyl-3,5-dimethylada-mantane.

9. The process according to claim 6 wherein the saturated cyclic hydrocarbon contains 12 carbon atoms and the adamantane hydrocarbon is 1,3-dimethyladamantane.

10. The process according to claim 6 wherein the saturated cyclic hydrocarbon contains 14 carbon atoms and the adamantane hydrocarbon is 1,3-dimethyladamantane.

* * * * *